No. 654,576. Patented July 24, 1900.
G. H. ABRAMS.
ICE MAKING APPARATUS.
(Application filed Apr. 14, 1896.)
(No Model.) 4 Sheets—Sheet 2.
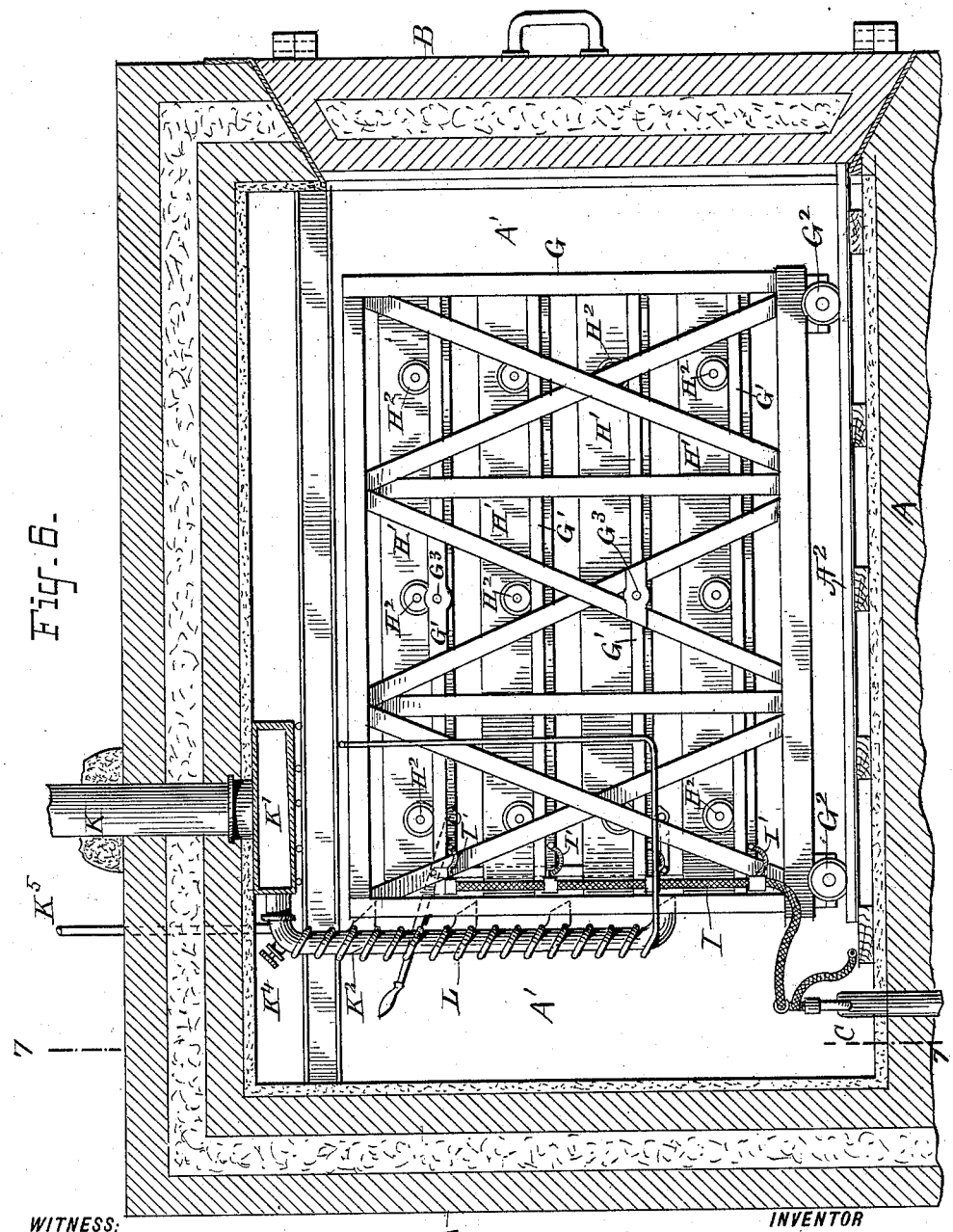

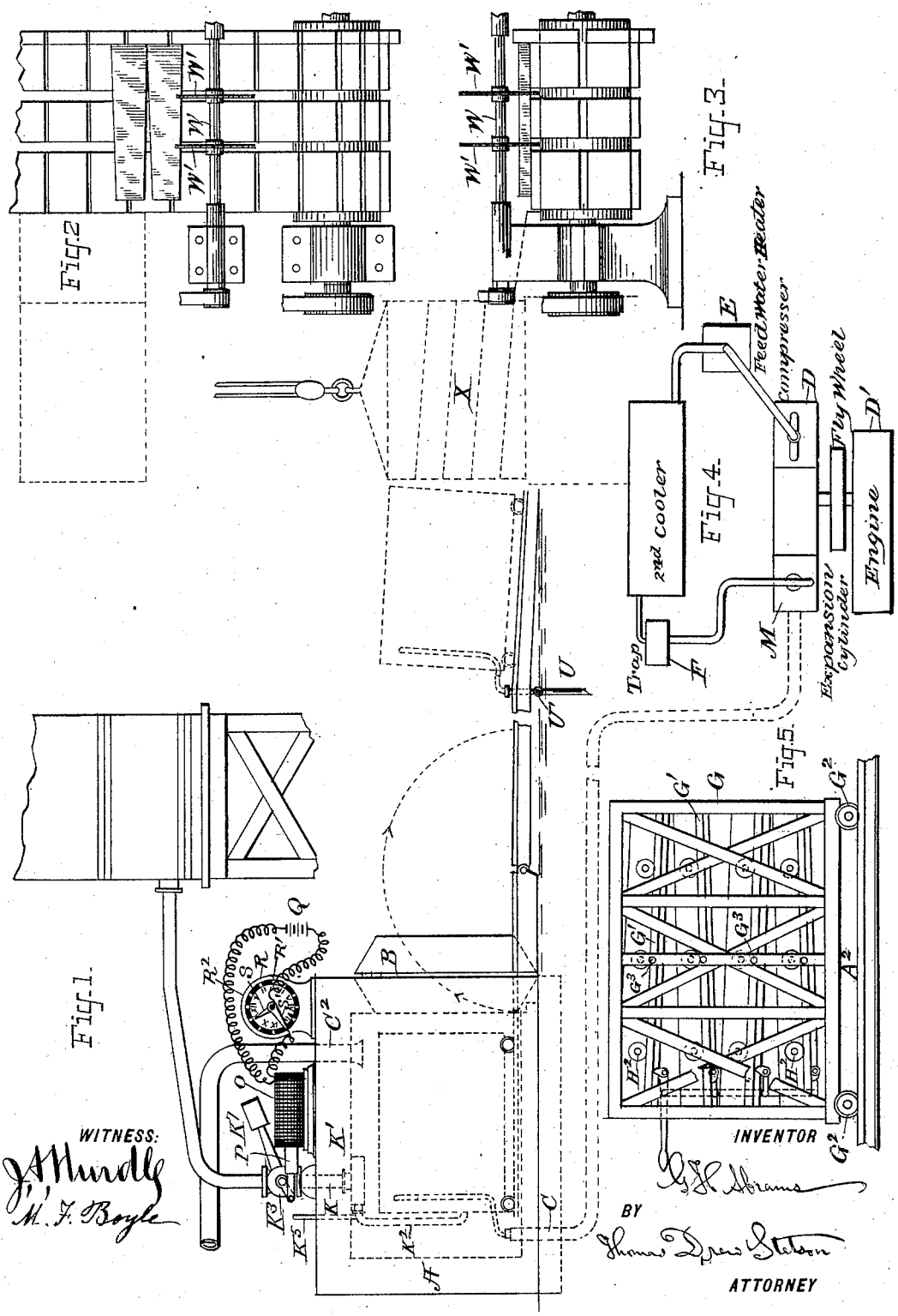

No. 654,576. Patented July 24, 1900.
G. H. ABRAMS.
ICE MAKING APPARATUS.
(Application filed Apr. 14, 1896.)
(No Model.) 4 Sheets—Sheet 3.
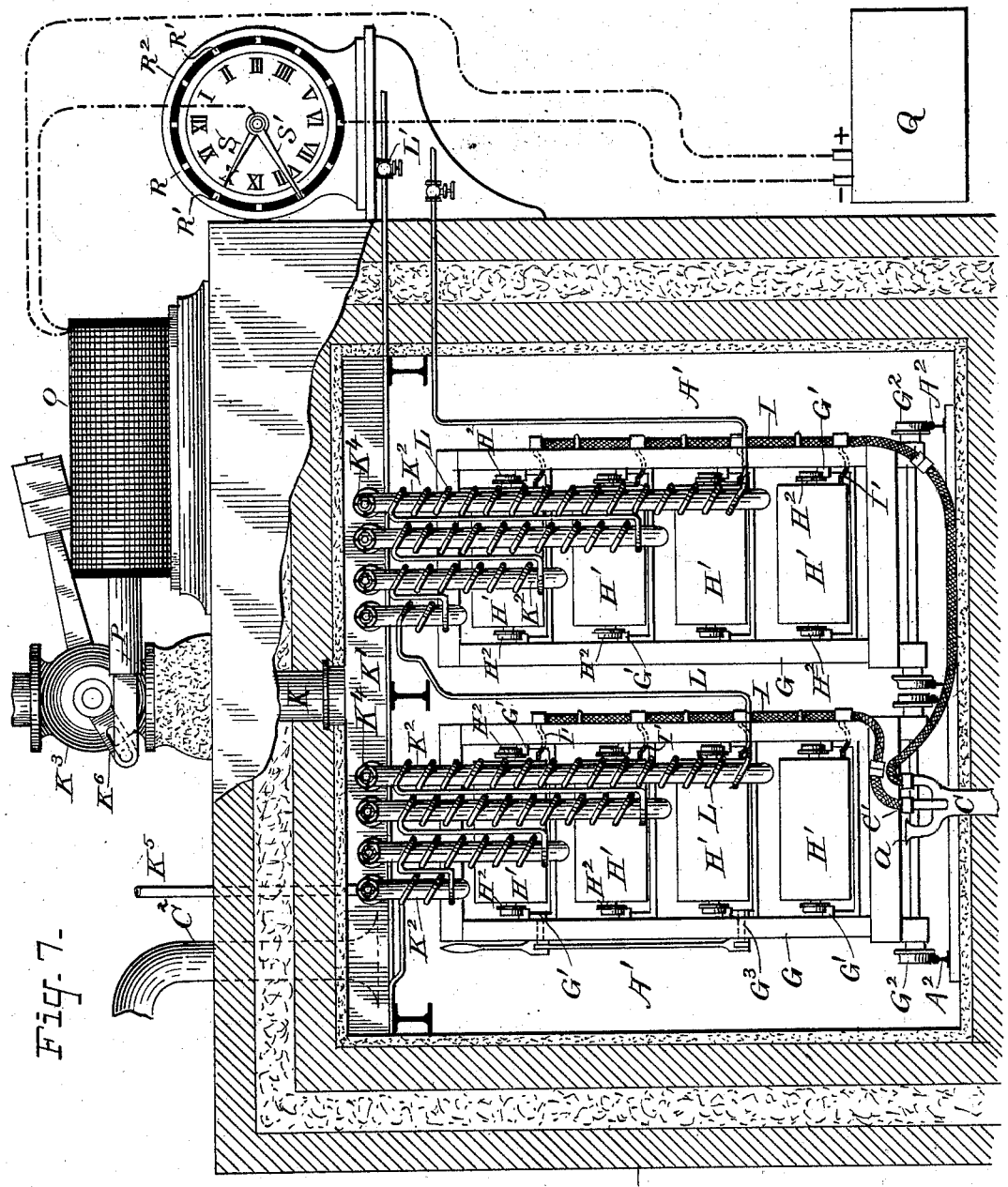
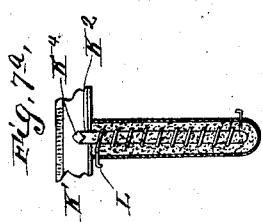
WITNESS:
INVENTOR
BY
ATTORNEY

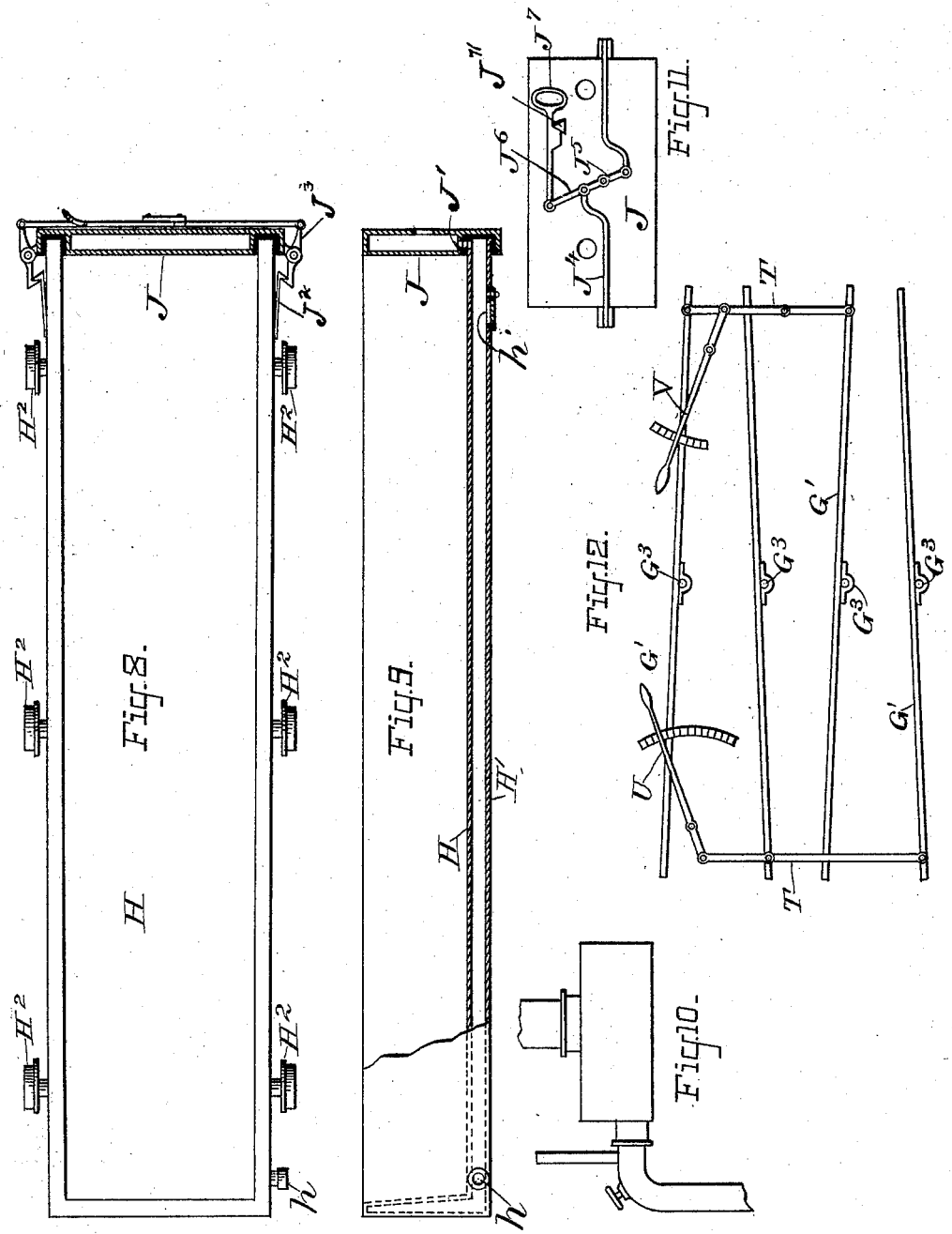

UNITED STATES PATENT OFFICE.

GEORGE H. ABRAMS, OF NEW YORK, N. Y.

ICE-MAKING APPARATUS.

SPECIFICATION forming part of Letters Patent No. 654,576, dated July 24, 1900.

Application filed April 14, 1896. Serial No. 587,514. (No model.)

*To all whom it may concern:*

Be it known that I, GEORGE H. ABRAMS, of New York, (Brooklyn,) Kings county, in the State of New York, have invented a certain new and useful Improvement in Ice-Making Apparatus, of which the following is a specification.

The general plan of manufacturing ice to which my invention relates is that in which long pans carried on a car are thus moved into the cold room while empty or containing but little sterilized water in each pan. The cold is introduced by a strong current of air carefully sterilized and injected into the apparatus at an extremely low temperature to circulate within and about the several pans, and the water is supplied slowly either constantly or by instalments until the several pans are filled. The ice is manufactured in lengths considerably greater than is convenient for use, and after the complete formation of the pieces they are sawed into the shorter lengths required. In order to make what I term "running-water ice," the pans or all the several pans above the lowermost are set inclined, and the water is admitted to each at the upper end and allowed to flow slowly along toward the lower end, the small quantity admitted to each becoming frozen on the way.
I provide for conveniently changing the inclination of the pans. At the finish the pans are set level, and each is supplied with a liberal quantity of water, which lies level on the top and makes a fair surface. All the other surfaces of the block are molded by the pan, and the block is nearly rectangular, being a very little wider at the top, so as to facilitate the removal of the ice. The pans are double, and there is a provision for blowing steam through the thin spaces between the two thicknesses of metal. The metal will absorb the heat of the steam and rapidly thaw the immediately-adjacent ice, thus momentarily setting free the mass. I provide for removing it during the brief period in which it remains thus freed. I also provide parts and connections whereby the said spaces between the two thicknesses of metal of the pans may also be placed in communication with a source of cold air, so that it may be introduced in the spaces to congeal the water.

The very low temperature at which my ice is manufactured attains important ends in the hygienic qualities of the ice.

I provide for warming the nozzles by which the water is introduced, so as to avoid the tendency to freezing of the water in the nozzles.

The accompanying drawings form a part of this specification and represent what I consider the best means of carrying out the invention.

Figure 1 is a side elevation showing clearly certain provisions for supplying water, with an outline of the cold room and track. It shows the car in dotted outlines in two positions, that on the right showing it in the position for delivering the ice into an elevator. Fig. 2 is a plan view of the saws and the provisions for carrying the long molded blocks of ice thereto to be divided. Fig. 3 is an end elevation of the same. Fig. 4 is a plan view showing on a small scale and in diagrammatic outline my provisions for compressing and cooling the air. Fig. 5 is an outline of the car with the pans tilted in opposite directions to make running-water ice. Figs. 6 and 7 are on a larger scale. Fig. 6 is a longitudinal section, and Fig. 7 is a transverse section on the line 7 7 in Fig. 6. Fig. 7$^a$ is a detail sectional view illustrating the antifreezing provisions for the pipes supplying water to the pans. Fig. 8 is a plan view; and Fig. 9, a longitudinal vertical section, partly in elevation, showing one of the double pans in which the ice is produced. Fig. 10 is a side view of a portion of the water-supply. Fig. 11 is an end view of a pan, showing provisions for securing and liberating the removable end. Fig. 12 is a side elevation showing on a larger scale the provisions for tilting the rails, and consequently the pans in the car.

Similar letters of reference indicate corresponding parts in all the figures where they appear.

I will use the letter A to indicate the stationary parts, the ground, the walls of the cold room, &c., using supernumerals, as A', to distinguish certain portions when necessary.

B is the door of the cold room.

C is a pipe which brings air at a very low temperature and distributes it within the interior of the cold room through nozzles C' and also through spaces between the inner and outer pans, to be presently described.

D is the compressor, worked by an engine D' and having the ordinary property of receiving the air and compressing it to the density of six atmospheres, more or less. The heat of compression developed by this treatment is absorbed by presenting cold water to the pipes in a condenser comprising the two vessels marked "Feed-Water Heater E" and "2nd Cooler," (see Fig. 4,) the air being thus reduced nearly to the normal temperature, while its pressure still remains at about ninety pounds per square inch.

F is a trap arranged to receive and discharge the considerable amount of moisture which is liable to be separated from the air in the act of cooling in the condenser. This air in being allowed to expand acts in a cylinder M by driving a piston. (Not shown.) The diameter of the cylinder and length of stroke and the time in which the piston reciprocates being rightly proportioned, the admission of the air is cut off at an early point in the stroke by devices which may be similar to the cut-off mechanism of steam-engines, and the air is allowed to expand, doing useful work in impelling the engine. At the end of the stroke it is discharged at or near the ordinary pressure of the atmosphere. This is the cold air which is introduced into the apparatus.

G G are cars running on wheels $G^2$ on the rails $A^2$ in the bottom of the cold room A'. Each is an open-work structure, as plainly shown in Fig. 5, and is equipped with rails G', extending longitudinally on each of the inner faces. I have shown four pairs of these rails mounted one over another adapted to support and allow longitudinal movement to four correspondingly-long pans. These pans are each of two thicknesses of metal H and H', held a little distance apart. The inner one, H, is the pan proper and is of the required form to mold the blocks of ice. Its length is sufficient to make three blocks of convenient size for storage and use. One end of the outer pan H' has a nozzle $h$, which is adapted to receive a flexible connection I' from a pipe I, which performs important functions. It supplies cold to effect the freezing, and at brief periods it supplies heat to detach the ice from the pan when the operation is completed.

In the act of effecting the freezing, which necessarily occupies the principal portion of the time in the manufacture of each batch of ice, the hose-pipe I', connected to the nozzle $h$, brings the air from the exhaust of the air-engine. This extremely-cold air moving through the spaces between the two thicknesses escapes at the orifice $h'$ at the bottom of the opposite end of the pan. It thence circulates in the general interior of the cold room, having its extremely-low temperature only slightly reduced by the passage through this space and absorbing caloric from the water in the interior of the inner pan. I prefer to deliver about two-thirds of the cold air into the cold room through the several pipes I and branches I', leaving another third to be introduced through an aperture (not shown) in or near the bottom of the cold room. These proportions may be varied within wide limits. It is only necessary that the inner pan H be cooled to a very low temperature and held there as the water is successively added and frozen in the interior of the pan and that there be provisions also for circulating cold air in the cold room, so that it shall act still more efficiently on the large exposed surface at the top of the freezing mass, and that all this be done without too much retarding or choking the delivery of the exhaust from the air-engine M.

It will be understood that the operation of filling the several pans with ice is effected by holding them in the car and supplying water which freezes in layers, commencing at the bottom and gradually filling each pan. The upper surface being directly exposed to the cold air throughout the whole operation, allows the process to proceed very rapidly. The caloric carried away by the blast of intensely-cold air through each space between the inner and outer pans also takes away the caloric, but less efficiently through the metal of the inner pan. The result is the manufacture of dense ice without any air-bubbles or cores. When a pan is completely filled, the contents are at a temperature far below the freezing-point. My experiments have indicated a temperature in the air and presumably an approximation thereto in the interior of the mass of ice of 80° Fahrenheit below zero. One end of each pan is closed by a removable flap or door $j$, which constitutes the entire end and which makes a tight joint, the said door also comprising two thicknesses to form a chamber, which when the door occupies a closed position, as shown in Figs. 8 and 9, will communicate with the pan-space through openings J', arranged to register with those of the pan. The pan will then be in a condition to serve for receiving water and accumulating the desired quantity of ice. The means for locking each door J in position and for effecting its release comprise spring-yielding catches $J^2$, located on the sides of the pan adjacent to its discharge end, dogs $J^3$ centrally pivoted in ears at each end of the door, and extended horizontal links $J^4$, parallel with the outer face of the door and having their outer extremities pivotally secured to the dogs, while their inner portions are bent, as indicated in Fig. 11, and connected to a bar or lever $J^6$ at either side of its pivotal attachment with the door, said bar being pivotally secured to the inner end of a rod $J^7$, provided with a suitable handle and having an offset intended when the lever is lifted and moved to engage a knife-edge lug $J^{71}$, projecting from the door, so that the door-securing means may be held in either an engaged or a disengaged position. When the cold-air connections with the pan are detached and the car is drawn from the cold room, the pans are then all inclined to the right and connected with a source of steam-supply by a pipe U, controlled by a valve U' to permit steam to flow through the spaces between the inner and outer thicknesses both of the pans and doors, water of condensation being discharged through the openings $h'$, the catches of the doors J being released during this operation. So soon as the steam has warmed the entire inner pan and the inner-door thickness it may be shut off, and the ice will be detached both from its pan and door, the latter being removed, and the ice will by an endwise movement slide down the incline and, escaping through the open end, be removed from the pan. Then the flap or door J at the end of the pan being replaced, the pan is ready to be reused, and when all the pans have been thus treated the car is ready to be returned into the cold room, the door B closed, and the current of cold air again driven through the spaces in the several pans, and also circulated actively through the general interior of the cold room and the water further supplied. Each pan is equipped with three pairs of wheels $H^2$, by which it is supported and is allowed to be easily moved endwise on the rails G'. The water is supplied to the several pans through a vertical pipe K and horizontal branch K' and a set of depending branches $K^2$, leading from the latter down to the several different depths required to supply the several pans. The lower end of each of the descending branches $K^2$ is deflected inward, as clearly shown in Fig. 6. It takes but a small portion of the cooling energy of the apparatus to lower the temperature of the water, the main effort required of the refrigerating apparatus being to dispose of the latent heat developed in the changing of the water to ice. I prefer to supply the water warm in order to reduce the liability of its freezing in the pipes K K' $K^2$. In order to further reduce the risk of freezing the water in these pipes or to provide a means for conveniently and rapidly thawing them if they should become frozen, I arrange spirally around the exterior of each of the large pipes $K^2$ a small pipe L, which carries brine. The flow of the brine is controlled by a valve L'. This valve may be opened a little, and the brine, introduced hot, goes down in one branch of the pipe L, makes a horizontal movement in the lower part, and returns again through the other branch pipe L and flows back to a boiler, (not shown,) in which the brine is warmed and is ready to serve again. The brine should be a saturated solution, so that it will not freeze at any temperature likely to be reached in these pipes.

In the manufacture by my apparatus of what I term "running-water ice" the water is allowed to flow slowly but constantly past the several valves $K^4$ and down the several descending pipes $K^2$ into the upper ends of the several inclined pans, the relative flow being controlled by the relative opening of the valves $K^4$. These are adjusted as shall be found necessary to make the several pans work alike and become filled with ice simultaneously. The ice thus made is superior in quality; but there are reasons lying partially in the reduction of the danger of freezing in the supply-pipe and partly in the uniformity of the distribution in the slightly-inclined pans why in operating in the large way it may be preferred for general practice to let the water in at intervals in liberal instalments and to close off the flow entirely between these intervals. I will now describe the provisions for working in this manner. In this mode of operating the flow of the water through the descending branches $K^2$ into the several pans is regulated by a valve $K^3$, which opens intermittently, and by the same screw-valves $K^4$, which are adjusted so as to simply modify the flow into each of the several connections $K^2$. The upper portion of each of these pipes is connected to an air-pipe $K^5$, which affords ample vent. When the valve $K^3$ opens, it lets a quantity of water descend sufficient, for example, to put one-fourth of a cubic foot of water into each of the pans H. So soon as the valve $K^3$ shuts the water in the horizontal pipe K' and in the several pendent pipes $K^2$ completely empties itself into the several pans, the vent-pipe $K^5$ supplying air to allow such movement. At the next opening of the valve $K^3$ the operation is repeated. By this means the water, which starts warm from the reservoir above, (not shown,) moves rapidly through the pipes K' and $K^2$ and will usually flow quite into the several pans H before it has been lowered to the freezing temperature. In the rare instances which prove exceptions to this when the lower end of one or more of the pipes $K^2$ is closed by being frozen up a flow of warm brine through the corresponding pipe L will thaw it out.

In either mode of operating the cold air after circulating among the pans and absorbing heat from the upper surfaces and also from all the other surfaces of the layer of water in each is discharged at the top of the cold room through a pipe $C^2$, which conveys it away and may lead it back to the compressor.

The valve $K^3$ is operated automatically at the proper intervals by an electromagnet controlled by a clock. O is the magnet, and P an armature which is controlled thereby and is engaged with the lever $K^6$ on the stop-cock $K^3$. Whenever the current from the dynamo or battery Q is allowed to complete its circuit through the electromagnet O, the armature P is drawn to the right, provisions being made for giving a sufficient motion to pull the valve $K^3$ into the wide-open position. Thus conditioned a strong flow of water comes through the pipe K and passing the valve $K^3$ fills or partially fills the horizontal pipe K' and flows downward through the several descending branches K² and flows into the several pans. The screw-valves K⁴ should be previously adjusted so that the brief flow of water descending in the several pipes will be just sufficiently restrained to deliver an equal quantity into each of the pans H. The completing of the circuit and effecting this important part of the process is controlled by a clock R, shown as mounted on one of the outer faces of the cold room; but it may be at a more distant point, if preferred. The clock is provided with the ordinary mechanism for keeping correct time and for turning the hands with a sufficient force to overcome a slight friction. The hour-hand S performs only its ordinary function of indicating the hour; but the minute-hand S' performs the additional function of making and breaking the electrical connection. R² is a circular rim around the clock-face having a smooth front face and a series of conductors R', equally spaced. When the minute-hand S' reaches one of these conductors R', the current received by the clock at the center shaft and allowed to flow outward through the minute-hand completes the circuit through the electromagnet O by allowing the current to flow through the conductor R' which it is then passing. After this has passed, which I prefer to adjust so that the valve shall be open only a fraction of a minute, the minute-hand moves upon the non-conducting portion of the ring R², and the current is stopped. Under these conditions the gravity of the weight K⁷ effects the prompt closing of the valve K³ and holds it closed until the circuit is again formed by the contact of the minute-hand with the next conductor R'. I have shown these conductors as being at such distance apart that the circuit will be completed for a brief period required at intervals of five minutes; but this can be varied. Two minutes or less may suffice.

I provide for varying the inclination of the several pans both in amount and direction. The lowermost pair of rails G' may be held permanently level in the car. Each of the other pairs of rails similarly marked mounted at a higher level is pivoted by its center to the car at the point G³. I have shown all as thus pivoted. The ends of the several tiers of rails are united by connecting-links T, located at one end, and connect the alternate rails. The levers T', turning on fixed pivots, are movably attached to the proper rails, so that by raising either lever the end of each rail to which it is attached will be depressed, and a corresponding movement of the other lever will depress its detached rails, so that all will assume positions inclining in opposite directions, as shown by Fig. 12. I can simultaneously or successively incline the several rails to varying extents, as shall be found expedient, in order to allow the water received at the upper end—the left hand in Fig. 5—to flow with just sufficient rapidity toward the other—the right-hand end. Near the termination of the treatment, before letting the last installment of water into each pan, I set them all level, and by elongating the period during which the current is flowing through the magnet O and the valve K³ stands open sufficient water is supplied to each pan to allow it to assume a level surface. Then a few minutes exposure to the low temperature completes the freezing and produces a remarkably-solid block of ice.

The masses of ice molded in the pans are too long to be convenient. They may be sawed off to any required length. I have in my experiments made the length of each block eleven feet and have sawed it into three lengths nearly four feet each. Ice is easily sawed, and I provide for effecting this portion of the operation rapidly and conveniently by mounting the proper number of circular saws W', of proper size, on a shaft W, which is rotated by the engine and is so located relatively to the point at which the ice is discharged from the several pans that each block may be lifted rapidly past the saws and be divided.

X is an elevator mounted near the cold-room, but with sufficient distance between. When the freezing is completed, the door B is opened and the car G, with its loaded pan, is moved out, and the steam being applied through the pipe I to momentarily warm the metal of each pan the ice is discharged from each down the incline into the elevator, the latter being set at the proper height to receive it. When the elevator is loaded with all four of the blocks of ice, or earlier, if preferred, it is raised past the saws W', and the saws divide the several long blocks into the proper number of convenient length.

Modifications may be made without departing from the principle or sacrificing the advantages of the invention. I can vary the number of the pairs of rails A² and cars running thereon, also the number of the rails G' in each car, and consequently the number of pans H H'. I can use other than screw-valves at the points K⁴ to equalize the flow into the several pans. There may be conditions under which no restraint will be necessary on the flow of the water through the descending pipes K². The water may descend continuously instead of at intervals. I can use other force than gravity to effect the closing of the valve K³.

I make no claim herein to the feature of absorbing the heat of compression from the air, leading or circulating the same through a feed-water heater, as this forms the subject-matter of a separate application by me for patent filed June 5, 1896, Serial No. 594,354.

I claim as my invention—

1. In an ice-making apparatus, the combination with a closed refrigerating-chamber A', of a car G movable therein, and carrying a vertical series of jacketed pans, antifreezing means for simultaneously and slowly supplying water to the several pans to permit it to be frozen in layers, and a source of refrigerant-supply with detachable connections with the spaces of the pans said source of refrigerant-supply having an independent communication discharging broadcast into the chamber, substantially as herein specified.

2. In ice-making apparatus, the combination with a closed refrigerating-chamber, of a car movable therein and carrying a plurality of pans arranged in vertical series and individually movable on guided wheels, detachable refrigerant connections with the pans, a distinct refrigerant-supply discharging broadcast into the room, means for tilting the pans, a suitably-protected water-supply pipe for the latter, and means for subjecting the pans to heat, all substantially as herein specified.

3. In ice-making apparatus, the combination with a refrigerating-chamber, of a car movable therein and carrying a plurality of pans individually movable on guide-wheels, and two sets of devices, as the hand-levers U and V, and the links connected thereto, arranged to allow all the pans to be inclined together or to be inclined a portion in one direction and a portion in another, so as to serve substantially as herein specified.

4. In ice-making apparatus, the combination with a refrigerating-chamber, of a car movable therein on supporting guide-wheels and carrying a plurality of pans individually movable on guide-wheels, and devices as the lever V, attached link secured to the pivotal pan-supports for tilting the pans, and means such as the recessed retaining-bar for holding the lever at determined points of the throw, substantially as herein specified.

5. In ice-making apparatus, the combination with a chamber having a supply for the refrigerating agent, of a portable ice-pan having one end closed by a removable flap and formed in two thicknesses of material to present a confined intermediate space and having a detachable connection with the refrigerant-supply, substantially as herein specified.

6. In ice-making apparatus, the combination with a chamber having a cold-air supply and discharge communicating with the upper and lower portions respectively thereof, of an ice-pan formed in two thicknesses of metal to present a confined intermediate space, and having a connection with the cold-air supply, and an opening discharging into the chamber, substantially as herein specified.

7. In ice-making apparatus, the combination with a closed chamber having a supply for the refrigerating agent, a series of pans each formed of two thicknesses of material to present a confined intermediate space, and a series of flexible pipes supplied by the refrigerant-supply and adapted to be detachably connected to the pans to supply the intermediate spaces thereof, a distinct refrigerant-supply discharging broadcast into the room together with a suitably-protected water-supply pipe for the pans and provisions for subjecting the latter to heat, substantially as herein specified.

8. In ice-making apparatus, the combination with a closed refrigerating-chamber, of a jacketed ice pan or pans therein, detachable refrigerant connections therewith for expanding air in the jacket-spaces thereof, together with a valve-controlled water-supply connecting with a pipe or pipes for delivering water to the pan or pans, antifreezing provisions for the pipe or pipes, thawing provisions for the pans, mechanism for intermittently operating the water-supply valve and a distinct supply of expanded air discharging broadcast into the room, substantially as herein specified.

9. In ice-making apparatus, the combination with a closed chamber having a refrigerant-supply, of an ice-pan having an open end and formed in two thicknesses of metal to present a confined intermediate space, connections for detachably establishing communication between the refrigerant-supply and said space, thawing provisions for said pans, a door or flap for closing the open end of the pan, spring-catch devices for locking said door and means for tilting said pan, together with a distinct refrigerant-supply discharging broadcast into the room, substantially as herein specified.

10. In ice-making apparatus, the combination with a closed refrigerating-chamber, of a jacketed ice pan or pans therein, together with a valved water-supply connecting with a pipe or pipes for delivering water to the pan or pans, detachable refrigerant connections for the latter, antifreezing provisions for the pipe or pipes, thawing provisions for the pans, an armature connected to the valve and an electromagnet and connections for completing the magnetic circuit to move the armature and operate the valve, together with a compressed-air supply for the detachable pan connections and for independently discharging broadcast into the room, substantially as herein specified.

11. In ice-making apparatus, the combination with an ice-pan having an open end and comprising two thicknesses of metal forming a confined intermediate space, a nozzle or its equivalent connected with the outer thickness of metal, and a door or flap also containing an intermediate space, and having an opening arranged, when the door is adjusted, to register with an opening in the pan leading to its confined space, substantially as herein specified.

12. In ice-making apparatus, the combination with a closed refrigerating-chamber having an expanded air admission and discharge, of ice-pans therein, together with a water-supply therefor having pipe connections therewith, antifreezing provisions for said pipe connections, thawing provisions for the pans, an electrically-controlled valve for the water-supply, and a time mechanism provided with adjustable circuit-contacts to coöperate with the timepiece and periodically actuate the electrical valve-operating devices, substantially as herein specified.

13. In an ice-making apparatus, a closed chamber having an expanded air admission and discharge, a number of pans in said chamber, a general water-pipe controlled by a valve opened intermittently, and branches supplying the water intermittently therefrom to the several pans, a series of nicely-adjustable valves each controlling the flow into the several pans so as to make the quantity delivered practically equal at each opened period, and means for tilting said pans, and thawing provisions for the latter, all substantially as herein specified.

14. In ice-making apparatus, the combination with a closed refrigerating-chamber having an expanded air admission and discharge, of a vertical series of ice-pans therein, a valve-controlled water-supply pipe communicating with a horizontal pipe K' in the upper part of said chamber, and having depending branches for feeding the pans, antifreezing provisions for said branches, thawing provisions for the pans, together with mechanism for periodically opening and closing the water-supply valve to determine the volume of water to be congealed, and means for tilting said pans, substantially as herein specified.

15. In an ice making and handling system, a refrigerating-chamber containing a car carrying a plurality of ice-pans of extended length and each having an intermediate space and nozzles or their equivalents, of provisions for inclining the pans, jacketed water-supply pipes intermittently controlled, a source of heat-supply adapted to connect with said nozzles to effect the release of the ice in blocks, and a cutting-saw and means for feeding the block to the saw together with a trackway leading from the refrigerating-chamber to the cutting-saws, substantially as herein specified.

16. In ice-making apparatus, the combination with a refrigerating-chamber, of an ice pan or pans therein, a water-supply pipe therefor, and a jacket of material low in conductivity, together with a pipe associated with said water-pipe and connecting with a source of fluid of higher temperature so as to provide means for thawing out the pipe when necessary, all combined substantially as herein specified.

In testimony that I claim the invention above set forth I affix my signature in presence of two witnesses.

GEORGE H. ABRAMS.

Witnesses:
J. B. CLAUTICE,
M. F. BOYLE.